(12) United States Patent
Hunt et al.

(10) Patent No.: US 11,210,453 B2
(45) Date of Patent: Dec. 28, 2021

(54) HOST PAIR DETECTION

(71) Applicant: Microsoft Technology Licensing, LLC, Redmond, WA (US)

(72) Inventors: Adam Hunt, El Cerrito, CA (US); Jonas Edgeworth, San Francisco, CA (US); Chris Kiernan, San Francisco, CA (US); Elias Manousos, San Francisco, CA (US); David Pon, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 346 days.

(21) Appl. No.: 15/787,654

(22) Filed: Oct. 18, 2017

(65) Prior Publication Data

US 2018/0109426 A1   Apr. 19, 2018

Related U.S. Application Data

(60) Provisional application No. 62/409,820, filed on Oct. 18, 2016.

(51) Int. Cl.
*G06F 40/143* (2020.01)
*H04L 12/24* (2006.01)
(Continued)

(52) U.S. Cl.
CPC .......... *G06F 40/143* (2020.01); *G06F 16/951* (2019.01); *G06F 16/9566* (2019.01);
(Continued)

(58) Field of Classification Search
CPC .. G06F 16/951; G06F 16/955; G06F 16/9566; G06F 16/958; G06F 16/972;
(Continued)

(56) References Cited

U.S. PATENT DOCUMENTS 8,505,094 B1 *  8/2013  Xuewen ............. H04L 63/1416
                                                    726/22
8,683,584 B1 *  3/2014  Daswani ............. H04L 63/1433
                                                    726/22
(Continued)

OTHER PUBLICATIONS

Ginty, Steve. "Derived Host Pairs from Web Crawling." RiskIQ Blog, Apr. 16, 2016. <https://www.riskiq.com/blog/analyst/derived-host-pairs-from-web-crawling/>. Accessed Aug. 8, 2020. (Year: 2016).*

(Continued)

*Primary Examiner* — Vivek Srivastava
*Assistant Examiner* — William C McBeth
(74) *Attorney, Agent, or Firm* — Wade IP Law PLLC

(57) ABSTRACT

The present disclosure relates to identifying and storing relationships between hosts that are used to present a web page to a user. In certain embodiments, a system for detecting host pairs is provided. The system may receive a first request to identify one or more host pairs associated with a first host. In response to receiving the first request, the system may send a second request to the first host for a document. The document may be a web page file that is used to build a web page associated with the first host. The web page file may include instructions that, when parsed, build the web page. In response to the second request, the first host may send a response to the system. The system may then use the data included in the response to build the web page. While building the web page, a pairing may be stored when a different host is contacted.

20 Claims, 7 Drawing Sheets

(51) Int. Cl.
*G06F 16/955* (2019.01)
*G06F 16/951* (2019.01)
*G06F 40/221* (2020.01)
*H04L 29/06* (2006.01)
*G06F 3/0484* (2013.01)

(52) U.S. Cl.
CPC ............ *G06F 40/221* (2020.01); *H04L 41/14* (2013.01); *G06F 3/04842* (2013.01); *H04L 63/1483* (2013.01)

(58) Field of Classification Search
CPC .. G06F 16/986; G06F 17/2247; G06F 17/272; G06F 40/143; G06F 40/221; H04L 41/14; H04L 63/1433; H04L 63/1483; H04L 67/02; H04L 67/10
See application file for complete search history.

(56) References Cited

U.S. PATENT DOCUMENTS

| | | | |
|---|---|---|---|
| 2007/0061877 A1* | 3/2007 | Sima | H04L 63/12 726/12 |
| 2011/0191664 A1* | 8/2011 | Sheleheda | G06F 16/00 715/205 |
| 2012/0174224 A1* | 7/2012 | Thomas | H04L 63/145 726/24 |
| 2012/0324568 A1* | 12/2012 | Wyatt | G06F 21/51 726/13 |
| 2014/0372400 A1 | 12/2014 | Ramachandran et al. | |
| 2016/0335353 A1* | 11/2016 | Gianos | G06F 16/951 |
| 2016/0364771 A1* | 12/2016 | Nielsen | G06F 16/9566 |
| 2016/0381047 A1* | 12/2016 | D'Aveta | H04L 63/1483 726/23 |
| 2017/0085583 A1* | 3/2017 | Torres | H04L 67/10 |
| 2018/0091546 A1* | 3/2018 | Davidson | G06F 16/9566 |
| 2018/0167336 A1* | 6/2018 | Lawrence, III | G06F 16/951 |
| 2019/0132289 A1* | 5/2019 | Hulick, Jr. | H04L 63/0227 |

OTHER PUBLICATIONS

PCT/US2017/057271, "International Search Report and Written Opinion", dated Dec. 15, 2017, 15 pages.

\* cited by examiner

HOST PAIR DETECTION

CLAIM OF PRIORITY AND INCORPORATION BY REFERENCE

The present application is a U.S. Non-Provisional patent application that claims priority and benefit from U.S. Provisional Application No. 62/409,820, filed Oct. 18, 2016, entitled "DERIVED HOST PAIRS FROM WEB CRAWLING," the entire contents of which is incorporated herein by reference for all purposes.

BACKGROUND

As the Internet becomes more widespread, new features are constantly being added to increase communication between systems. However, these new features are often hidden from the view of users. For example, rendering a web page of a website within a domain may include (1) a request for a resource from a different domain, (2) executing a script (e.g., JavaScript) in the web page that causes a communication to be sent to a different domain, and/or (3) a redirection to a different web page hosted on a different domain. As a result, it may be challenging to identify what actions were performed while rendering the web page.

SUMMARY

The present disclosure relates generally to network analysis, and more particularly to identifying and storing relationships between hosts that are used to render a web page. The relationships may then be used to identify malicious use and behavior of a domain through a pairing of one or more hosts to a host that is validly registered. For example, the pairing may reveal malicious behavior (e.g., phishing and spoofing) using hosts to direct traffic to a malicious web page.

In certain embodiments, a system for detecting host pairs is provided. The system may receive a first request to identify one or more host pairs for a first host. The first request may be generated by a user or by the system. In response to receiving the first request, the system may send a second request to the first host for a document associated with a web page. The document may be a web page file that is used to build the web page. The web page file may include instructions that, when parsed, build the web page. In response to the second request for the document, the first host may send a response to the system. The system may then use the data included in the response to build the web page.

While building the web page, a pairing may be stored when a second host is contacted. For example, the pairing may be generated in response to: (1) the document for the web page causing content to be obtained from the second host; (2) the document for the web page causing a redirection event to occur (e.g., a HTTP 302 redirect); (3) an iframe obtaining content from the second host; (4) embedded code (sometimes referred to as a script) for the web page sending a message to the second host (e.g., JavaScript); (5) a link on the web page to a web page of the second host; or (6) the like.

In some embodiments, the system may provide one or more interfaces (e.g., an application programming interface, a graphical interface, or the like) for managing and configuring the process described above. A user may operate the one or more interfaces to specify a starting point for the system to identify host pairs (e.g., a malicious host name, a host name associated with the user, or any information that a web page may be identified from). When a host name is specified, one or more web pages associated with the host name (e.g., all of the web pages hosted by a host with the host name) may be used for the process described above.

In some embodiments, the system may execute periodically to search and identify pairings based upon the starting point. For example, the search may be performed based upon a timing schedule (e.g., hourly, daily, weekly, monthly, etc.). The pairings may be stored and compared to identify changes of pairs over time. Accordingly, an interface may track hosts based on pairings. An interface may allow a user to obtain additional information regarding a pairings.

According to embodiments described above, techniques may be provided for identifying host pairs. For example, techniques may include receiving, by a computer system, a first request to identify one or more host pairs for a first host. The first request may include a first Uniform Resource Identifier (URI) associated with the first host. In some embodiments, the first request may be sent to the computer system in response to selection of a user-selectable option provided in a user interface. In other embodiments, the system may expose an application programming interface (API) to one or more users. The API may be used to cause the first request to be sent to the computer system.

In response to the first request, a second request for a web page may be sent using the first URI. Sending the second request to the first URI may cause the second request to be sent to the first host.

A response to the second request may be received from the first host. The response may be parsed to build the web page. In some embodiments, the response may include a header. In such embodiments, parsing the response may include parsing the header. In some embodiments, the response may include a body (in addition to or instead of the header). In such embodiments, parsing the response may include parsing the body.

Parsing the response may cause one or more additional URIs to be called, where an additional URI is associated with a second host. In some embodiments, the response may include a script, where the script causes the additional URI to be called. In some embodiments, the response may include a request for content, where the request for content is associated with the additional URI. In response to the additional URI being called, a pairing of the first host with the second host may be stored in a database.

At some time after the pairing is stored, a request from a user may be received. The request may be for one or more pairings associated with the first host. In response to the request, the system may obtain the pairing from the database. The pairing may then be output to the user to indicate that the second host was called when building a web page associated with the first host.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments of the present disclosure are described in detail below with reference to the following figures.

FIG. 4 illustrates a user interface for outputting host pairs to a user according to certain embodiments.

FIG. 6 illustrates another user interface for outputting host pairs to a user according to certain embodiments.

DETAILED DESCRIPTION

Figure 1:
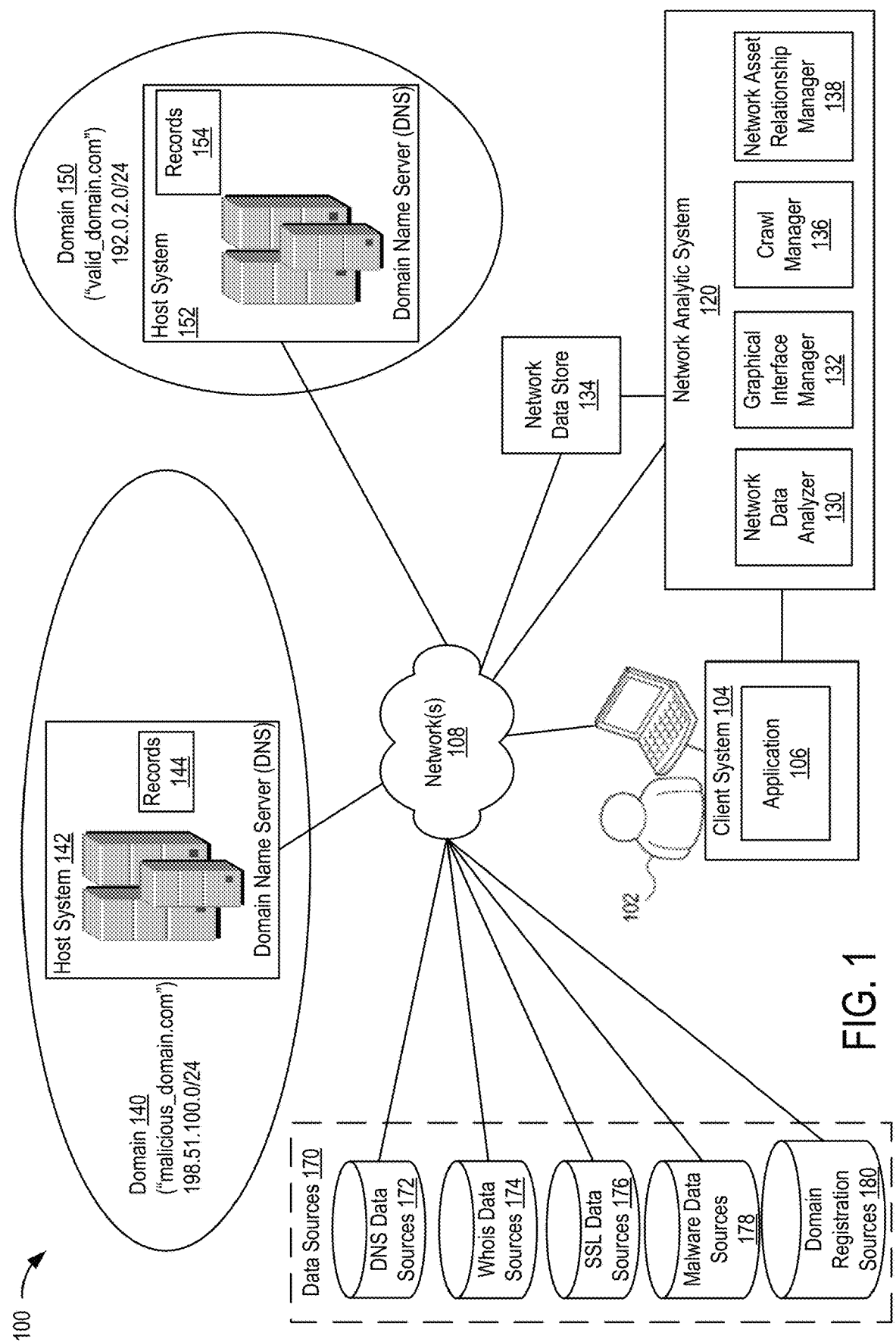
FIG. 1 is a simplified block diagram of a distributed system according to certain embodiments.

The present disclosure relates generally to network analysis, and more particularly to identifying and storing relationships between hosts that are used to build a web page. The relationships may then be used to identify malicious use and behavior of a domain through a pairing of one or more hosts to a host that is validly registered. For example, the pairing may reveal malicious behavior (e.g., phishing and spoofing) using hosts to direct traffic to a malicious web page.

In certain embodiments, a system for detecting host pairs is provided. For example, the system may receive a first request to identify one or more host pairs. In some embodiments, the first request may be associated with a first host such that the request is for identifying one or more host pairs for the first host. In other embodiments, the first request may be associated with the first host such that the system begins a search for host pairs at the first host, but then continues to other hosts to identify host pairs for those hosts. The first request may include a first Uniform Resource Identifier (URI)). In response to receiving the first request, the system may send a second request to the first host. The second request may be to obtain a document associated with a web page (the web page corresponding to the first URI). The second request may be included in a Hypertext Transfer Protocol (HTTP) message that is generated by the system. The document may be a web page file (e.g., a Hypertext Markup Language (HTML) file) that is used to build the web page. The web page file may include instructions that, when parsed, build the web page.

In response to the second request, the first host may send a response to the system. The response may include the document (which may be used to build the web page). The document received by the system may include a header, a body, the like, or any combination thereof.

The system may then use the document included in the response to build the web page. For example, the system may parse the response to identify one or more resources to obtain to build the web page. The system may then obtain the one or more resources. To obtain a resource, the system may send a request to a second host. The second host may then return the resource.

Once the system has the one or more resources, the system may build the web page. In some examples, building the web page may including building a Document Object Map (DOM), a Cascading Style Sheets (CSS) Object Map (CSSOM), and/or a render tree. The DOM may be a map of where things are displayed on the web page according to the HTML. The CSSOM may be a map of what styles should be applied to different parts of the web page according to the CSS. The render tree may combine the DOM and the CSSOM to create a map of how the web page will look. Using the DOM, CSSOM, and/or the render tree, the system may build the web page such that it may be displayed.

While building the web page, the document may include a redirection. The redirection may cause the web page to be switched with a different web page from a different host. In addition, the document may include one or more scripts that cause messages to be sent to a different host. It should be recognized that other events, not described herein, may occur while building a web page that cause a different host to be contacted.

When a different host is contacted, a pairing may be stored between (1) a host that provided code that caused the different host to be contacted and (2) the different host. For example, if a web page associated with a first host (e.g., first.com) causes a second host (e.g., second.com) to be contacted, a pairing may be generated that includes first.com and second.com (e.g., [first.com, second.com]). For illustrative purposes, the pairing may be generated in response to: (1) the web page obtaining content (referred to as a resource above) from the second host; (2) the web page causing a redirection event to occur (e.g., a HTTP 302 redirect); (3) an iframe obtaining content from the second host; (4) embedded code (sometimes referred to as a script) for the web page sending a message to the second host (e.g., JavaScript); (5) a link on the web page to a web page of another host; or (6) the like. A first host paired with a second host may be referred to as the first host being associated with the second host.

In some embodiments, the system may provide one or more interfaces (e.g., an application programming interface, a graphical interface, or the like) for managing and configuring the process described above. A user may use the one or more interfaces to specify a starting point for a search to identify host pairs (e.g., a malicious host name, a host name associated with the user, or any information that a web page may be identified from). When a host name is specified, one or more web pages associated with the host name (e.g., all of the web pages hosted by a host with the host name) may be used for the process described above. The system may execute periodically to search and identify pairings based upon the starting point. An interface may track hosts based on pairings. An interface may be interactive to obtain information regarding a pairing.

In some embodiments, the system may identify a pairing by determining a value (e.g., a score) between each of two hosts that are compared. The score between any pair of hosts may be determined based on a multi-factor algorithm. Examples of factors include, without restriction, frequency based on occurrence of a pairing and similarity between the pairing with other hosts. The factors may be weighted to determine the value. The measure may be based on a mean (e.g., a harmonic mean) of the factors. In some embodiments, the system may determine the value by traversing relationships between hosts and/or domains.

For illustrative examples, a web page may be a text file that includes text and a set of HTML tags. The tags may be instructions that indicate how the web page should look when the web page is displayed. HTML is a markup language that described how a page should be formatted. A web browser may be used to view the web page. A web browser is a computer application that is configured to navigate to a web server on the Internet and request a web page. The web browser may be further configured to interpret the set of HTML tags within the web page in order to display the web page on a screen. A web server may be configured to respond to a web browser's request for a web page, and deliver the web page to the web browser through the Internet.

I. Exemplary Distributed System

FIG. 1 is a simplified block diagram of distributed system 100 according to certain embodiments. Distributed system 100 is not intended to suggest any limitation as to scope of use or functionality of described embodiments.

Distributed system 100 may include one or more client systems 104 (referred to herein as "client system" or "client") and network analytic system 120. Network analytic system 120 may be implemented by a computing system. Client system 104 may be operated by one or more users (e.g., user 102), such as a network analyst whose role it is to assess network activity and to determine possible malicious events related to the network activity.

Client system 104 may present a user interface (e.g., a graphical user interface or a command prompt), or a combination thereof to a user. The user interface may be generated by client system 104, received from network analytic system 120, or a combination thereof. The user interface may be updated or modified by client system 104 or network analytic system 120 in response to one or more interactions with the user interface.

Figure 3:
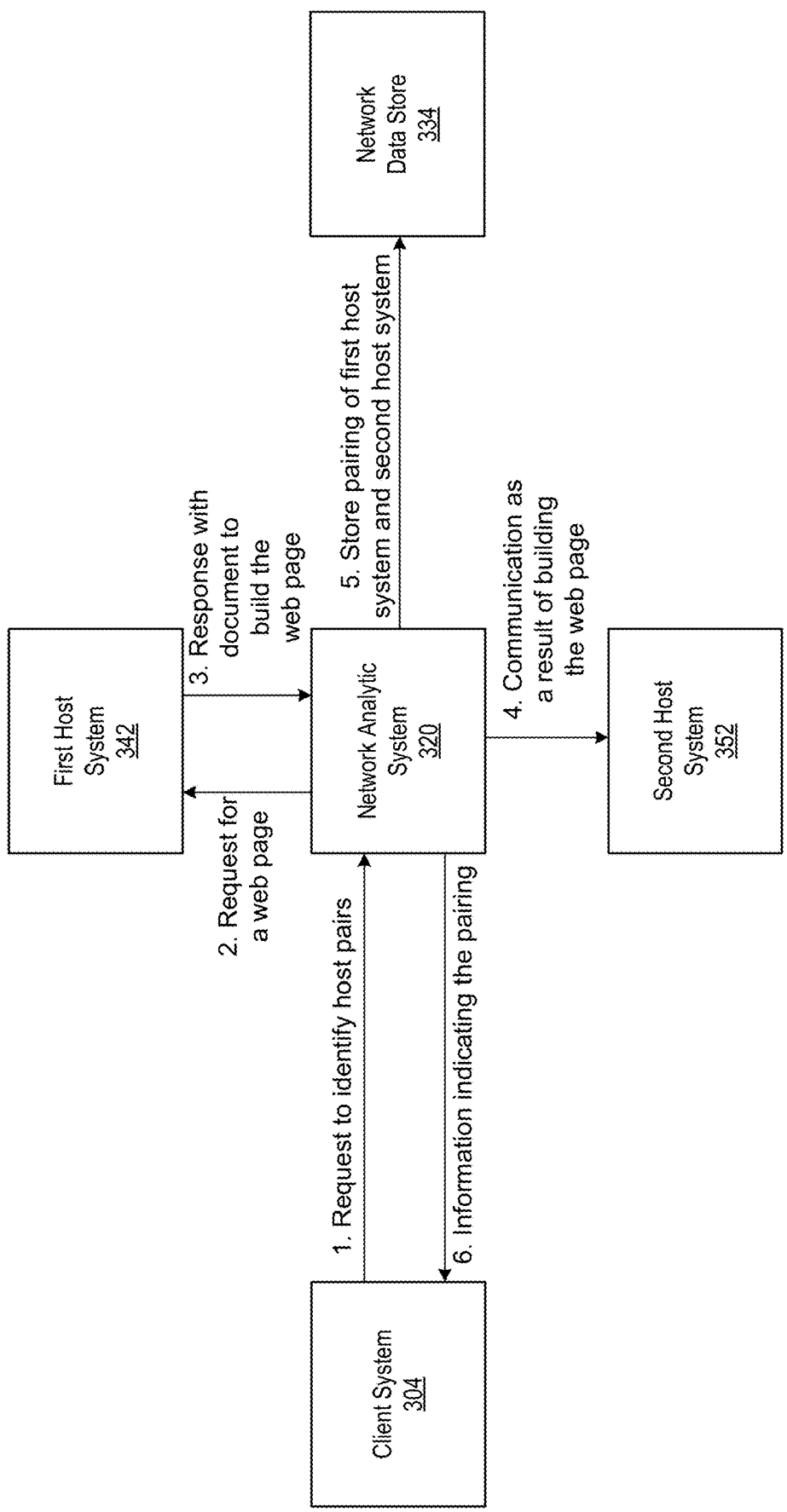
FIG. 3 is a simplified block diagram of communications sent in a distributed system according to certain embodiments.
Figure 4:
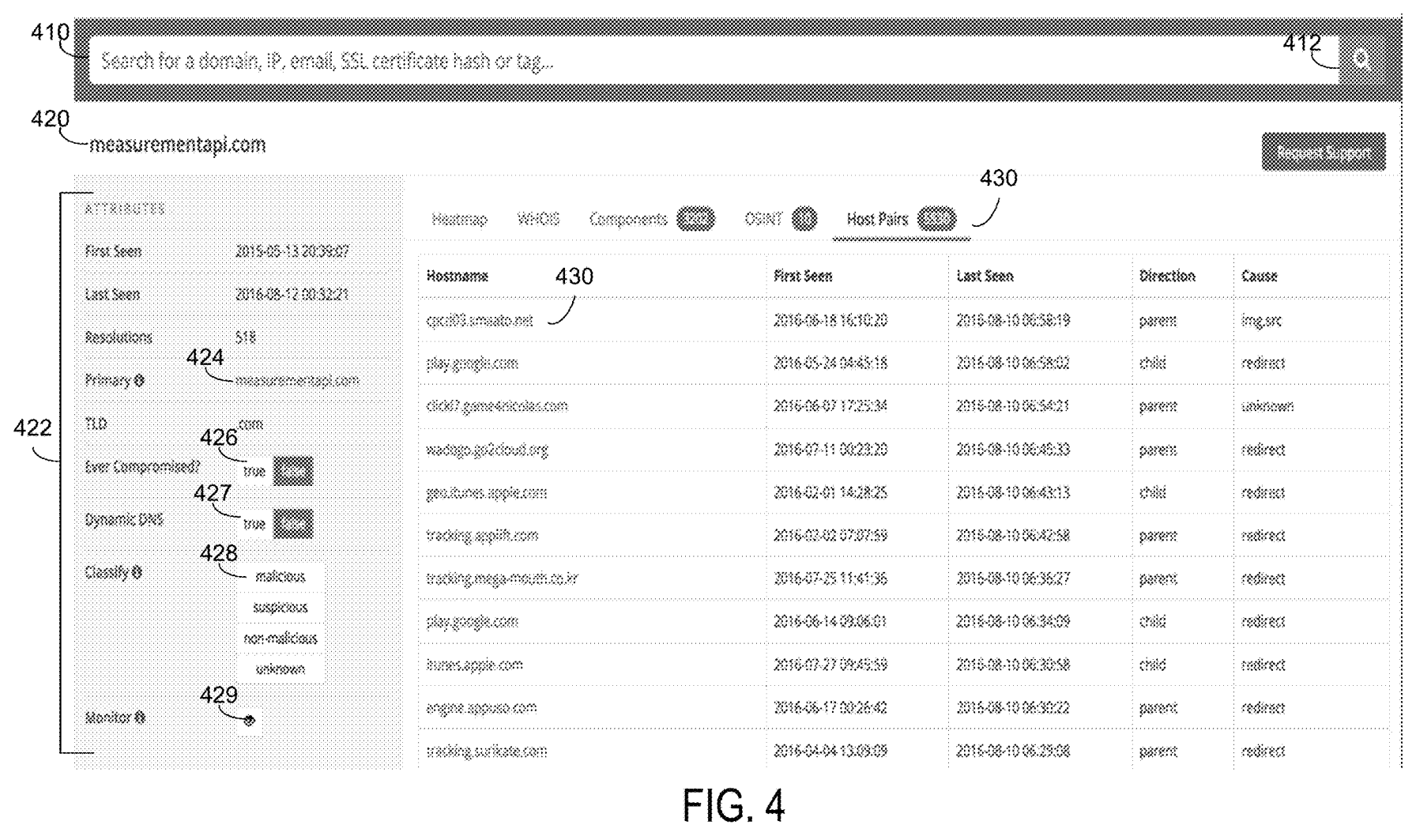

The user interface may be provided by network analytic system 120 via network 108 as part of a service (e.g., a cloud service) or application. For example, network analytic system 120 may expose an application programming interface (API) such that the API may be used in the user interface. For another example, a graphical user interface, such as illustrated in FIGS. 3 and 4, may be provided. In some embodiments, client system 104 may provide access to one or more applications 106 ("app"). App 106 may enable a user to access and perform services provided by network analytic system 120.

Client system 104 and network analytic system 120 may be communicatively connected via one or more communication networks 108. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Figure 5:
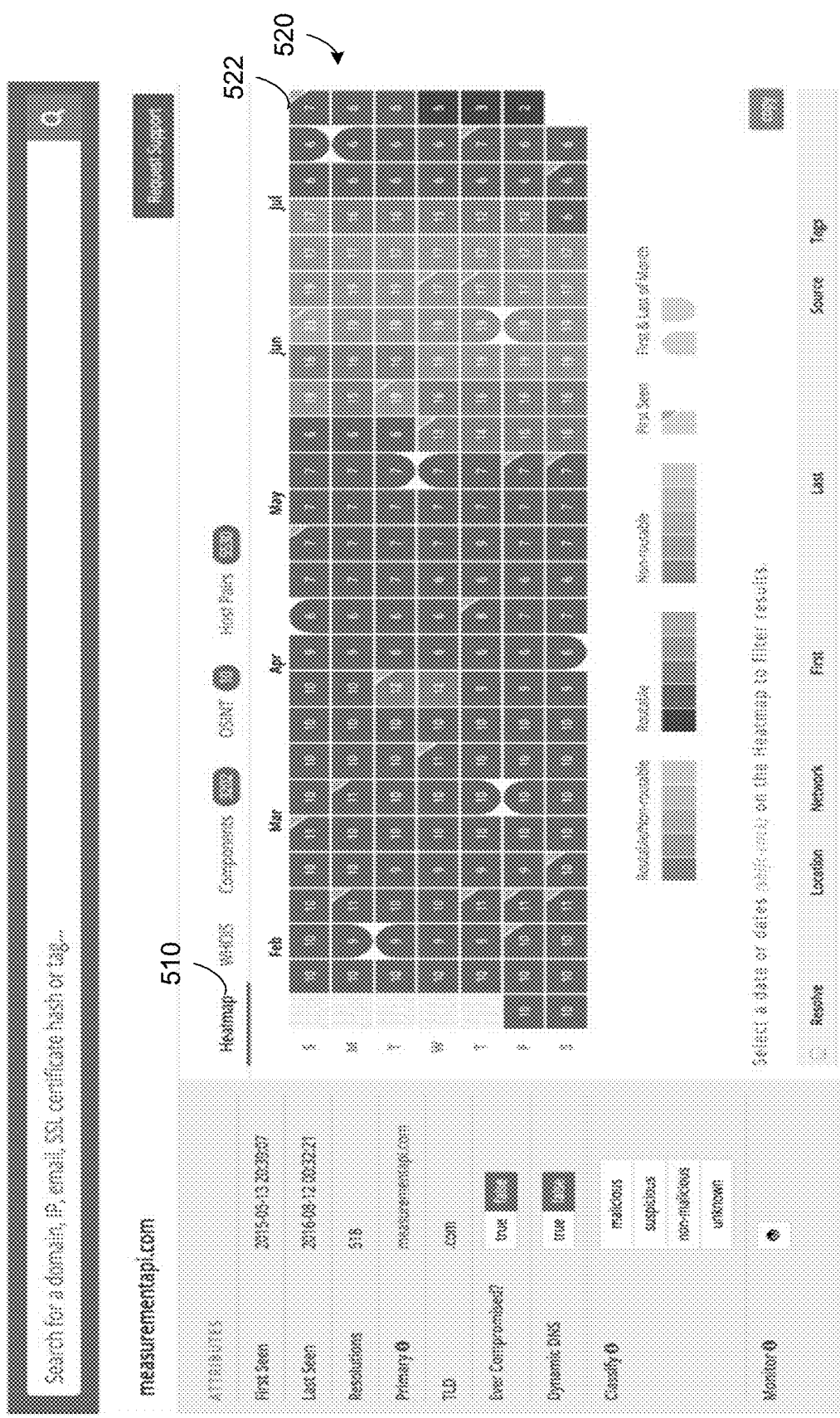
FIG. 5 illustrates another user interface for outputting host pairs to a user according to certain embodiments.

Network analytic system 120 may be implemented using a computer system (such as illustrated in FIG. 5), which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up network analytic system 120 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, network analytic system 120 may be included in or implemented with a product provided by RiskIQ® Corporation. In some embodiments, network analytic system 120 may be implemented with or included in any of the systems incorporated by reference, such as the systems described in the patent application referenced in this disclosure. In various embodiments, network analytic system 120 may be configured to run one or more services or software applications described in the foregoing disclosure. Network analytic system 120 may correspond to a computing system for performing processing as disclosed herein according to an embodiment of the present disclosure.

In some embodiments, network analytic system 120 may be implemented as an enterprise computing system or a cloud computing system comprising one or more computers and/or servers that may include those described above. Network analytic system 120 may include several subsystems and/or modules, including some, which may not be shown. For example, network analytic system 120 may include network data analyzer 130, graphical interface manager 132, crawl manager 136, and network asset relationship manager 138. Network analytic system 120 may have more or fewer subsystems and/or modules than shown in the figure, may combine two or more subsystems and/or modules, or may have a different configuration or arrangement of subsystems and/or modules. Subsystems and modules of network analytic system 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analytic system 120 may also provide other services or software applications may include non-virtual and virtual environments. In some embodiments, these services may be offered as web-based or cloud services or under Software as a Service (SaaS) model to the users of client system 122. The services offered by network analytic system 120 may include application services. Application services may be provided by network analytic system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers may utilize applications executing in network analytic system 120, which may be implemented as a cloud infrastructure system. Users may acquire the application services without the need for customers to purchase separate licenses and support. Various different SaaS services may be provided. Users operating client system 122 may in turn utilize one or more applications to interact with network analytic system 120 to utilize the services provided by subsystems and/or modules of network analytic system 120.

Network analytic system 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes disclosed herein. The memory in network analytic system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Distributed system 100 may also include or be coupled to one or more data sources 170, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, distributed system 100 may be coupled to or may include one or more data sources, such as DNS data sources 172, WHOIS data sources 174, SSL data sources 176, malware data sources 178, and domain registration data sources 180. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources 170 may be accessible by network analytic system 120 using network 108.

Distributed system 100 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, distributed system 100 may be coupled to or may include one or more data stores, such as network data store 134. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 134 may be accessible by network analytic system 120 using network 108.

Distributed system 100 may include one or more network domains (e.g., an Internet domain), such as domain 140 and domain 150. Each domain may be implemented by a host system, which implements a domain name server (DNS) for the domain. The DNS may maintain a directory of domain names and translate, or resolve them to Internet Protocol (IP) addresses. Domain 140 may include a host computing system 142, Host computing system 142 may stores records 144 to implement a DNS for domain 140. Domain 140 and domain 150 may be mapped (e.g., via DNS) to one or more IP addresses. Domain 150 may include a host computing system 152. Host computing system 152 may store records 154 to implement a DNS for domain 150. Domain 140 may be communicatively connected to network 108 via an access network. Domain 150 fray be communicatively connected to network 108 via an access network.

It should be noted that although not shown in FIG. 1, each of domain 140 and domain 150 may include one or more sub-domains. Each domain may also be a sub-domain of a larger domain. A domain may map to one or more IP addresses (e.g., via DNS), where each IP address is associated with a host (e.g., a host computing system). A host or host system as referred to herein may include one or more domains, and one or more IP addresses associated with each domain. As used herein, a host may include general purpose computers, as well as other devices, that have an IP address.

Distributed system 100 may implement one or more techniques for determining relationships between network-based assets for network infrastructure analysis, as described further below. The techniques may be useful for tracking and analyzing network infrastructure for network-based digital assets. Such assets may be owned or associated with an entity (e.g., a company or network domain). Examples of network-based assets include, without restriction, domains, hosts, domain name system (DNS) name servers, Internet protocol (IP) addresses, IP address blocks, mail servers, secure sockets layer (SSL) certificates, web servers, web pages, cookies, and particular files (e.g., advertisements, videos, etc.).

Network analytic system 120 may process network data from multiple data sources 170 to identify relationships between network-based digital assets. For example, network analytic system 120 may determine a relationship between network-based assets (e.g., hosts). The techniques disclosed herein may be modified by one skilled in the art to determine a relationship between any type of network-based assets. Individual embodiments may be described as a process which may be depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes disclosed herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). For example, network analytic system 120 may implement the processes disclosed herein. Any of the processes may be implemented as a service to a user of network analytic system 120.

The particular series of processing steps disclosed herein are not intended to be limiting. Other sequences of steps may also be performed according to alternative embodiments. For example, alternative embodiments of the present disclosure may perform the steps outlined above in a different order. Moreover, the individual steps may include multiple sub-steps that may be performed in various sequences as appropriate to the individual step. Furthermore, additional steps may be added or removed depending on the particular applications. One of ordinary skill in the art would recognize many variations, modifications, and alternatives.

A process may be performed by network analytic system 120 to determine a relationship between network-based assets, such as a pair of hosts that are related. The process may include determining a configuration for each of one or more crawl processes to gather data about network-based assets. The process may include receiving a crawl configuration via one or more interfaces. The interfaces may be generated by graphical interface manager 132 and provided to a client system for presentation. One or more crawl processes may be determined based on the crawl configuration(s). Crawl processes may be generated using one or more instructions (e.g., code or script). Crawl processes may be implemented to search networks, e.g., the Internet, for network-based assets according to a crawl configuration. In some embodiments, a crawl process may be implemented starting with one or more network-based assets (e.g., a host) as a source (e.g., a target network-based asset) from which to initiate a crawl process. The source may be chosen based on input by a user. The source as the basis for a crawl may be based on one or more network-based assets that are identified as being malicious, such as by techniques disclosed in U.S. Non-provisional application Ser. No. 14/938, 802 entitled "IDENTIFYING PHISHING WEB SITES USING DOM CHARACTERISTICS" and filed on Nov. 11, 2015 and in U.S. Non-provisional application Ser. No. 14/938,814 entitled "USING HASH SIGNATURES OF DOM OBJECTS TO IDENTIFY WEBSITE SIMILARITY" and filed on Nov. 11, 2015. Each of the above-identified applications are considered part of this disclosure and are incorporated herein by reference for all purposes.

The crawl processes may be implemented in or using a discovery and inventor process, such as for discovery and inventory system disclosed in U.S. Non-Provisional patent application Ser. No. 14/520,029 filed on Oct. 21, 2014 and entitled "SYSTEM AND METHOD FOR IDENTIFYING INTERNET-FACING ASSETS." The above-identified application is considered part of this disclosure and is incorporated herein by reference for all purposes. Network data analyzer 130 may implement processes to generate and/or identify network data. In some embodiments, the process may include network data analyzer 130 gathering data from data sources 170 corresponding to network-based assets identified during a crawl process. The crawl processes may be implemented according to a schedule that is part of the configuration. The crawl process is a dynamic process by which web pages of network-based assets are dynamically rendered at the time when the crawl process is implemented.

In at least one embodiment, a crawl process may be implemented using techniques for crawling one or more sources, such as a web page of a host. The crawl process may be implemented to traverse through a source, such as a web page to identify different network-based assets and the relationships between those assets. The crawl process may include determining a cause of a relationship between network-based assets, such as a redirect link, an image source, script (e.g., JavaScript), or other active element of a network-based asset. The crawl process may be configured to determine the extent to which relationships are identified and traversed. In some embodiments, a crawl process may be restricted so as to not overburden and/or notify a malicious network-based asset of crawling that might lead to detection of malicious behavior. A crawl process may include performing any of the techniques disclosed herein for crawling. In some embodiments, a crawl process may include processing data of network-based assets and rendering elements of a web page for a network-based asset. Any active element in a web page of a web site that is crawled is rendered to determine whether any other network-based assets may be identified. Network-based assets may be identified to the extent defined by a crawl configuration. A web page may be rendered according to a model (e.g., a document object model). Active code and frames in a web page may be rendered. Redirects in a web page may be followed. Images and active elements in a web page may be obtained or activated. The crawl process may monitor and log information about network-based assets identified in the crawl process. Log information may be used to identify referrer and referee of network-based assets to identify a relationship.

The process may include network asset relationship manager 138 performing operations to process the data obtained by the crawl manager 136 to determine relationships (e.g., derived host pairs) between network-based assets. The data may be updated as crawl processes are scheduled to be repeated. Network asset manager 138 may determine a relationship between network-based assets using multi-factor algorithm based on the data gathered by crawl processes and supplemented from data sources 170. The process may include determining attributes, including, without restriction, frequency based on occurrence of a relationship, similarity between network-based assets that are identified as being related, the nature of the relationship (e.g., parent and child), a type of link (e.g., a cause of the relationship), any other information about a relationship between assets, similarity of neighbors that are related to an asset, or combinations thereof. The factors may be weighted based on the asset which is analyzed for relationships. The measure of a relationship may be based on one or more measures, such as a mean (e.g., a harmonic mean) of the factors and the weights assigned to each of those factors. The relationships between assets may be computed based on a request by a user with respect to any network-based asset. More weight may be applied to assets that have been previously identified as malicious. Information about previously identified malicious assets may be considered in determining a relationship using the crawl process.

The process may use graphical interface manager 132 to generate and provide interfaces to display information about relationships between network-based assets. The interfaces may be provided as part of an application. The application may be provided as a service or code to a client system. The interfaces may provide information about analysis of the relationships such as malicious behaviors and patterns. The malicious behavior may be presented as a suspect list or blacklists. The malicious behavior may be combined with other previously identified malicious behavior to provide a more comprehensive analysis of network security threats.

II. Host Pair Detection

As described above, a system for detecting host pairs is provided. The system may receive a first request to identify one or more host pairs for a first host. In response to receiving the first request, the system may send a second request to the first host for a document associated with a web page. The document may be a web page file that is used to build the web page. The web page file may include instructions that, when parsed, build the web page. In response to the second request for the document, the first host may send a response that includes the document to the system. The system may then use the document to build the web page. While building the web page, a pairing may be stored when a different host is contacted.

A. Flowchart

Figure 2:
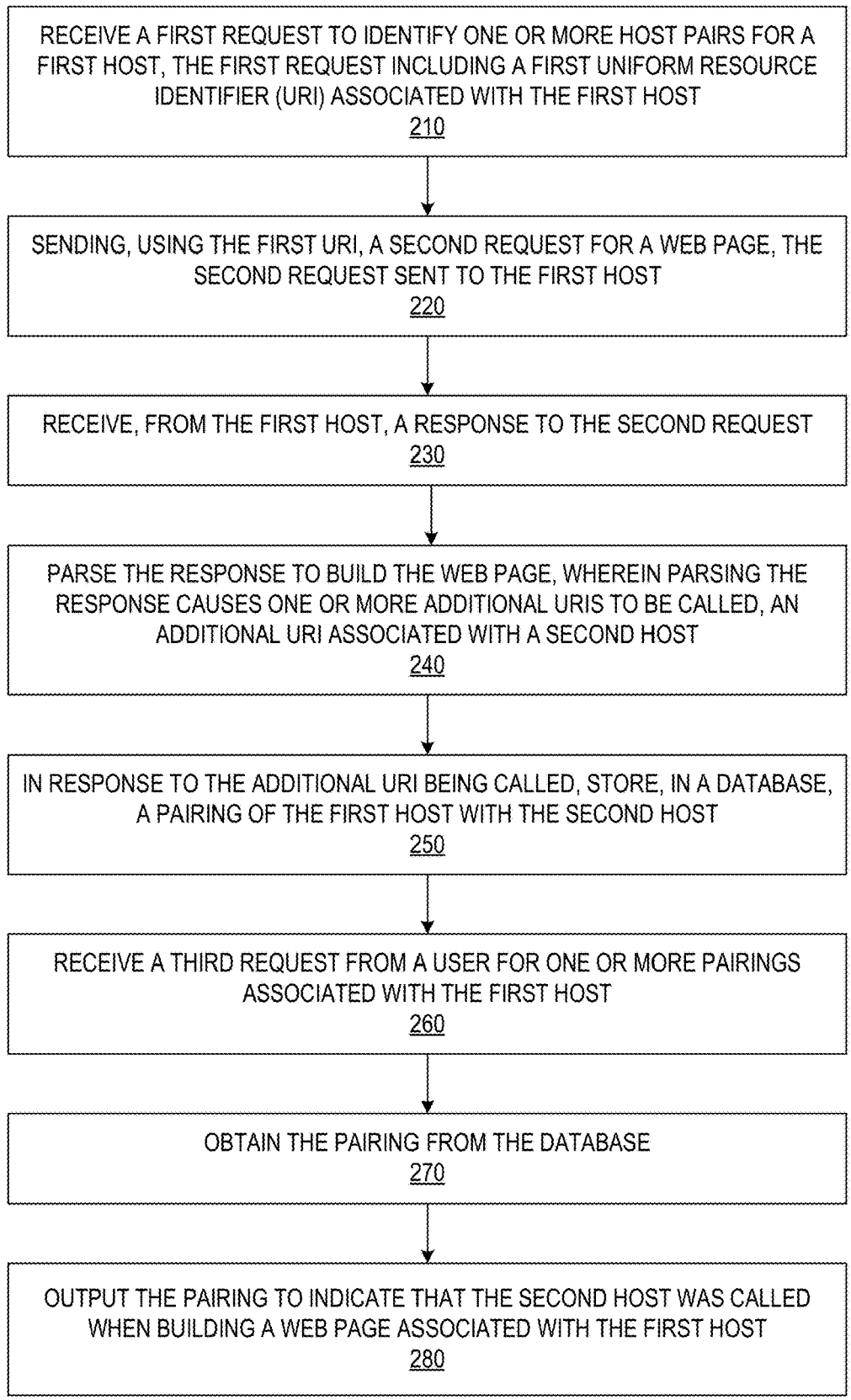
FIG. 2 is a simplified flowchart depicting processing performed by a system according to certain embodiments.

FIG. 2 is a simplified flowchart depicting processing performed by a system according to certain embodiments. The system may be used to detect and output host pairs. A host pair may be a pairing between a first host and a second host. In some examples, a host pair may include information regarding the pairing, such as a direction of child or parent (i.e., the first host is a parent or a child of the second host) and a cause that outlines the relationship connection, as further described below. These values may provide insight into redirection sequences, dependent requests, or specific actions performed when rendering a web page.

The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. Although FIG. 2 depicts the various processing steps occurring in a particular sequence or order, this is not intended to be limiting. In certain embodiments, the steps may be performed in some different order or some steps may also be performed in parallel.

At 210, a first request to identify one or more host pairs for a first host is received. In some embodiments, the first request may be sent to the computer system in response to selection of a user-selectable option provided in a user interface. In other embodiments, the computer system may expose an application programming interface (API) to one or more users. The API may then be used by a user to cause the first request to be sent to the computer system. For example, the first request may be a result of an API call that takes in as input a URI.

In some embodiments, the first request may include a first uniform resource identifier (URI) associated with the first host. For example, the first URI may be a uniform resource locator (URL) or a unifier resource name (URN) associated with a web page that is hosted by the first host. In other embodiments, the first request may include a domain name, a domain name system (DNS) name server, an Internet protocol (IP) address, an IP address block, a mail server, a secure sockets layer (SSL) certificate, a web server name, a cookie, content associated with a web page, or the like. In such embodiments, the first URI may be determined based upon the first request. For example, if the first request includes a domain name, one or more URIs associated with web pages included in a domain associated with the domain name may be identified. Each of the one or more URIs may be processed according to embodiments described herein.

At 220, a second request for a web page may sent to the first URI. The second request may be generated in response to the first request. The second request may be an HTTP request that is generated based upon the first URI. For example, the first URI may be parsed to identify a location to send the second request.

At 230, a response to the second request may be received. The response may be received from the first host. The response may include a web page file (e.g., a text file in a format according to Hypertext Markup Language). The web page file may be parsed by a web browser to build the web page. The web page file may include a header, a body, the like, or any combination thereof. For example, a simple web page file may be the following:

```
<html>
  <head>
    <title>A Web Page</title>
  </head>
  <body>
    Hello world.
  </body>
</html>
```

In some examples, the web page file may include a link to another web page that would cause the web page to switch to the other web page. For example, the HTML for a simple link to another page is the following: <a href=https:/ www.helloworld.com">HelloWorld</a>. In some examples, instead of switching to another web page, a new window may be used for the other web page. In such examples, the HTML may be the following: <a href="https://www.helloworld.com" target="_blank">. In other examples, rather than having a different web page be loaded, HTML may cause a communication to be sent to a different host (e.g., <a href="mailto: example@howstuffworks.com">E-mail Me</a>). In other examples, HTML may cause content to be obtained from a different web page. In other examples, other methods that cause another web page (or host) to be accessed may be used.

At 240, the response may be parsed to build the web page. In some examples, parsing the response may cause a domain object model (DOM) to be constructed for the web page. For example, as the response is parsed, elements can be added and removed from the DOM. In some examples, a change to the DOM may cause at least one additional URI to be called.

In some examples, parsing the response may cause one or more additional URIs to be called. An additional URI of the one or more additional URIs may be associated with a second host, the second host different than the first host. In some embodiments, parsing the response may include parsing the header and/or the body of the response. In such embodiments, parsed data may include a script. The script may cause the additional URI to be called. In other embodiments, parsed data may include a request for content. The request for content may be associated with the additional URI.

In some examples, calling the additional URI may cause a change in the DOM associated with the web page. In response to the change, a relationship (sometimes referred to as a pairing) between the additional URI and the change may be recorded. For example, if the additional URI causes an image to be added to the web page, the DOM for the web page may be changed to indicate the image is to be rendered for the web page. In such an example, a relationship may be recorded that the additional URI caused the image to be added to the DOM.

At 250, in response to the additional URI being called, a pairing of the first host with the second host may be generated and stored in a database. For example, a tuple may be generated that includes the first host and the second host. In some examples, the pairing of the first host with the second host may include the pairing between the additional URI and the change. In some embodiments, the tuple may include additional information associated with the pairing. Examples of additional information may include a number of times that the particular pairing has occurred, a cause of the pairing, the particular code called that caused the pairing, information that was sent to the second host from the first host, or the like. The database may be included with or remote from the system.

At 260, a third request from a user may be received. The user may be the same user or a different user than the one that sent the first request. The third request may be to obtain one or more pairings associated with the first host. At 270, in response to the third request, the pairing may be obtained from the database. At 280, the pairing may be output to indicate that the second host was called when building the web page associated with the first URI. Examples of the output are illustrated in FIGS. 3, 4, and 5.

While the description above relates to identifying a single level of host pairs (e.g., host pairs of a first host), it should be recognized that multiple levels may be identified (e.g., a host pair of a host pair of the first host, etc.). In addition, while the above relates to host pairs, it should be recognized that pairs may be of different network-based assets, such as URIs, sub domains, content, etc.

B. Example Modules and Communications

FIG. 3 is a simplified block diagram of communications sent in a distributed system according to certain embodiments. The distributed system may include client system 304 (similar to client system 104 in FIG. 1), network analytic system 320 (similar to network analytic system 120), network data store 334 (similar to network data store 134), first host system (similar to first host system 142), and second host system 352 (similar to second host system 152).

A first communication that may be sent in the distributed system is a request (referred to as a first request above) to identify one or more host pairs from client system 304 to network analytic system 320 (indicated by "1." in FIG. 3). The first request may include an identification of a network-based asset that may be used to identify a host system. Examples of network-based assets include domains, hosts, domain name system (DNS) name servers, Internet protocol (IP) addresses, IP address blocks, mail servers, secure sockets layer (SSL) certificates, web servers, web pages, cookies, and particular files (e.g., advertisements, videos, etc.). For illustrative examples, the network-based asset will be a URI (e.g., data.htm, dmn.tld/page.htm, or ftp://ste.org/file.pdf) associated with first host system 342.

Based upon the URI, network analytic system 320 may generate an HTTP request (referred to as a second request above) to send to first host system 342. The HTTP request may be used to obtain a web page corresponding to the URI and stored by first host system 342. For example, the HTTP request may be sent to first host system 342 (indicated by "2." in FIG. 3).

In response to the HTTP request, first host system 342 may send a response to network analytic system 320 (indicated by "3." in FIG. 3). The response may include a document that may be used to build the web page. For example, the document may be a web page file that includes HTML. In some examples, the document may include a header and a body.

Network analytic system 320 may parse the document to identify one or more host systems to contact. For example, the document may cause network analytic system 320 to contact second host system 352 (indicated by "4." in FIG. 3). For illustrative purposes, a request for content from second host system 352 may cause network analytic system 320 to contact second host system 352. For another example, a script included in the document may cause network analytic system 320 to contact second host system 352. For another example, the document may include a redirection, causing the web page to switch to a web page associated with second host system 352. It should be recognized that the document may include other causes for second host system 352 to be contacted.

In response to network analytic system 320 contacting second host system 352, network analytic system 320 may generate a pairing between first host system 342 and second host system 352. The pairing may indicate that code from first host system 342 caused network analytic system 320 to contact second host system 352. It should be recognized that second host system 352 may cause a third host system (not illustrated) to be contacted. In such an example, a pairing may be generated between second host system 352 and the third host system.

In response to generating the pairing, network analytic system 320 may store the pairing in network data store 334 (indicated by "5." in FIG. 3). In addition to or instead of storing the pairing, network analytic system 320 may send information indicating the pairing to client system 304 (indicated by "5." in FIG. 3). In some examples, network analytic system 320 may send a report after all host pairs have been identified in response to the first request.

In some examples, a client system may request to view host pairs for a network-based asset. In such examples, network analytic system 320 may obtain pairing information for the network-based asset and send the pairing information to the client system. This may occur instead of steps 1-5 described above.

C. User Interfaces

FIG. 4 illustrates a user interface (referred to as a first user interface) for outputting host pairs to a user according to certain embodiments. The first user interface may include search bar 410, which may be used to search for one or more host pairs. For example, a user may insert a domain name, a host name (e.g., first host name 420), an IP address, an email, a SSL certificate has, a tag, or the like into search bar 310. The user may then select user-selectable button 412 to cause the process beginning at 210 described in FIG. 2 to be performed. A result of the process described in FIG. 2 may be one or more host pairs for a first host. For example, a host pair may be the first host (corresponding to first host name 420) and a second host (corresponding to second host name 430).

In some embodiments, the first user interface may include information 422. Information 422 may be associated with the first host. For example, information 422 may include when the first host was first seen, last seen, and/or a number of resolutions to the first host. Information 422 may be gathered as the process depicted in FIG. 2 is performed. For example, a web crawl for a URI may cause the first host to be called one or more times. Information 422 may reflect these one or more times and/or one or more previous web crawls performed by a system described herein.

In some examples, information 422 may include link 424 to a web page associated with the first host. Information 422 may further include an indication of the top-level domain of the first host.

In some examples, information 422 may further include first set of user-selectable boxes 426 (e.g., true/false). First set of user-selectable boxes 426 may indicate whether the first host has ever been identified as compromised. First set of user-selectable boxes 426 may be activated based on previous web crawls of the first host. For example, if a system (or a user) has previously identified the first host as compromised, a user-selectable box associated with true may be highlighted. First set of user-selectable boxes 426 may also be selected by a user while viewing information 422. First set of user-selectable boxes 426 may affect a frequency that the first host is searched for one or more host pairs (e.g., cause searches to be performed more or less frequent).

Information 422 may further include second set of user-selectable boxes 427. Second set of user-selectable boxes 427 may indicate whether the first host includes a dynamic DNS (e.g., true/false). Second set of user-selectable boxes 427 may operate similar to as described above for first set of user-selectable boxes 426. Second set of user-selectable boxes 427 may affect a frequency that the first host is searched for one or more host pairs.

Information 422 may further include third set of user-selectable boxes 428. Third set of user-selectable boxes 428 may indicate a classification of the first host (e.g., malicious, suspicious, non-malicious, or unknown). Third set of user-selectable boxes 428 may operate similar to as described above for second set of user-selectable boxes 427. Third set of user-selectable boxes 428 may affect a frequency that the first host is searched for one or more host pairs.

Information 422 may further include monitor button 429. Monitor button 429 may indicate whether the first host is currently being monitored (i.e., periodically search for host pairs) by a system described herein. A user may activate or deactivate monitor button 429.

The first user interface may also include information associated with one or more host pairs. In some examples, the information may be displayed in response to host pairs button 430 being selected.

The information may include a hostname ("hostname") of a second host (e.g., second host name 430), time information such as when the pairing was first seen ("first seen") and last seen ("last seen"), and/or a direction ("direction") of the relationship (e.g., parent or child) with the target host. A parent host is a host that directs traffic to the target host. A child host is a host to which the target host directs traffic. For example, when a web page from a first host obtains an image from a second host, the first host would be a parent host and the second host would be a child host.

The information about a pairing may further include a cause ("cause"), such as what event caused the host to have a relationship with the target host. Examples of causes include an image source (i.e., an image was requested from the second host), a redirect (e.g., a web page from the first host caused a web page from the second host to be opened), or unknown (i.e., it is unknown what caused the second host to be called).

FIG. 5 is another user interface (referred to as a second user interface) for outputting host pairs to a user according to certain embodiments. In some examples, the second user interface may be displayed when heatmap button 510 is selected. The second user interface may include a heat map 520. Heat map 520 may display data (e.g., host pair information) for a time period. For example, each box 522 may indicate a number of host pairs identified for a particular host on a particular day. In such an example, a system as described herein may include a time schedule that causes the system to identify one or more host pairs for a host according to the time schedule. For example, the time schedule may be set to have the system identify the one or more host pairs hourly, daily, weekly, etc.

Figure 6:
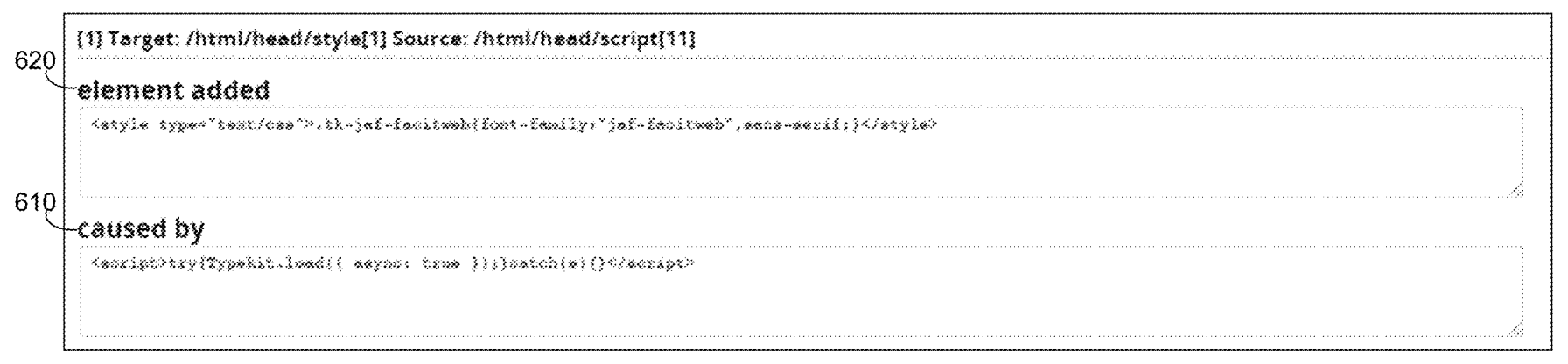

FIG. 6 illustrates another user interface (referred to as a third user interface) for outputting host pairs to a user according to certain embodiments. The third user interface may be in addition to the first and the second user interfaces described above. The third user interface may be presented when a particular host pair is selected in one of the user interfaces described in FIGS. 4 and 5.

The third user interface may indicate the particular code that caused a host pair to be identified (reference 610). For example, whenever a document associated with a web page causes a second host to be called, a system may record the particular instruction that caused the second host to be called. The particular instruction may then be included in the third user interface.

The third user interface may also indicate whether an element was added to a domain object model (DOM) due to a host pair, and include the element that was added (reference 620). For example, while a web page is being built according to a document (e.g., a web page document as described above), the DOM associated with the web page may be updated. In such an example, a call to a different host may cause the DOM to be updated. However, such updates may sometimes be hidden due to multiple updates to the DOM. Accordingly, techniques described herein may store the changes to the DOM such that a user may view the DOM during parsing of the document, before the DOM has reached a final state.

III. Exemplary Computing Systems

Figure 7:
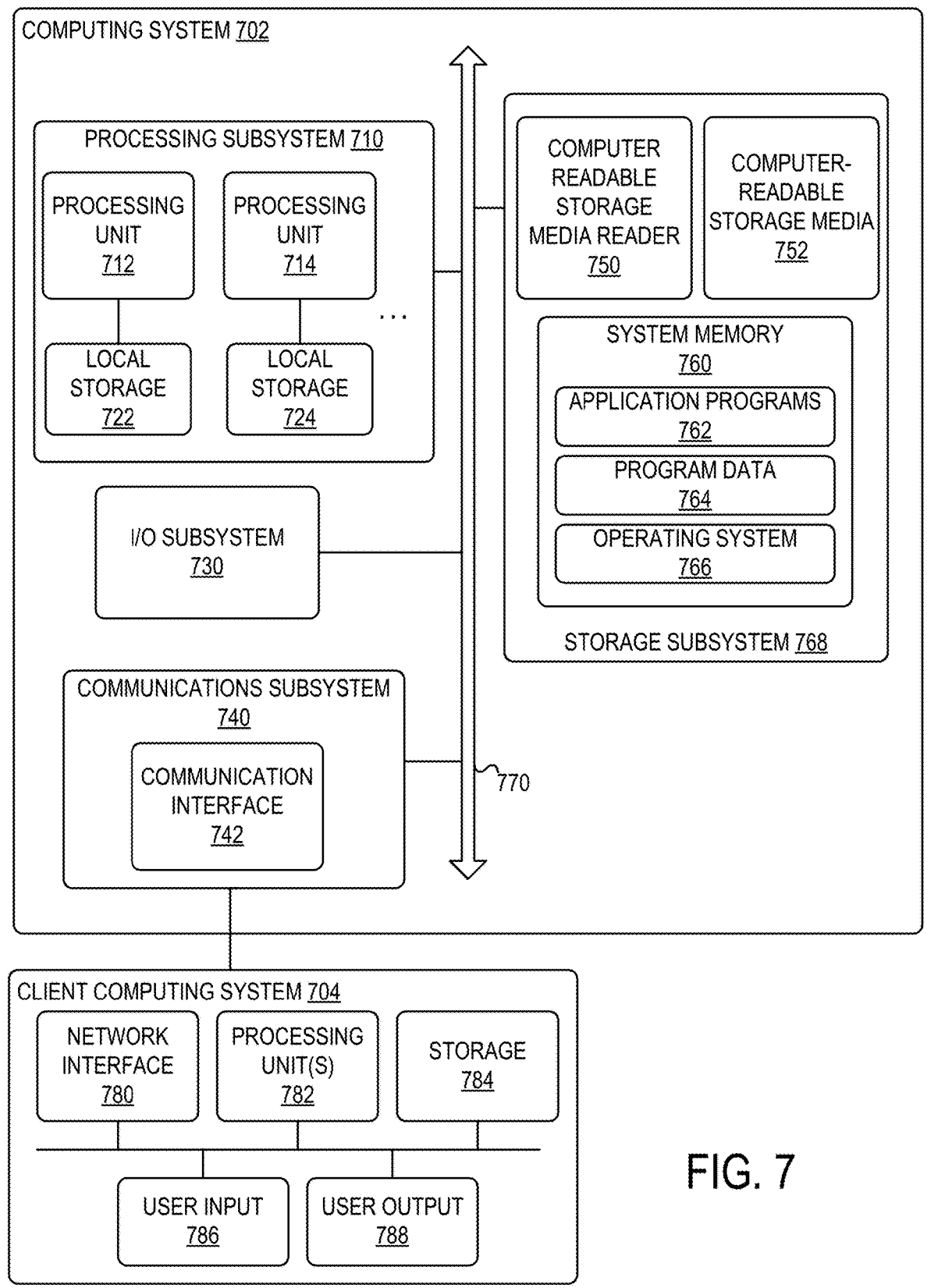
FIG. 7 is a simplified block diagram of a computing system and a client computing system usable to implement certain embodiments.

Various operations disclosed herein may be implemented on computer systems, which may be of generally conventional design. FIG. 7 shows a simplified block diagram of a representative computing system 702 and client computing system 704 usable to implement certain embodiments of the present disclosure. In various embodiments, computing system 702 or similar systems may implement network analytic system 120, or any other computing system disclosed herein or portions thereof. Client computing system 704 or similar systems may implement client system 104, or other client systems disclosed herein.

Computing system 702 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 702 may include processing subsystem 710. Processing subsystem 710 may communicate with a number of peripheral systems via bus subsystem 770. These peripheral systems may include I/O subsystem 730, storage subsystem 768, and communications subsystem 740.

Bus subsystem 770 provides a mechanism for letting the various components and subsystems of server computing system 704 communicate with each other as intended. Although bus subsystem 770 is shown schematically as a single bus, alternative embodiments of the bus subsystem may utilize multiple buses. Bus subsystem 770 may form a local area network that supports communication in processing subsystem 710 and other components of server computing system 720. Bus subsystem 770 may be implemented using various technologies including server racks, hubs, routers, etc. Bus subsystem 770 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 730 may include devices and mechanisms for inputting information to computing system 702 and/or for outputting information from or via computing system 702. In general, use of the term "input device" is intended to include all possible types of devices and mechanisms for inputting information to computing system 702. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 702 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 710 controls the operation of computing system 702 and may comprise one or more processing units 712, 714, etc. A processing unit may include one or more processors, including single core processor or multicore processors, one or more cores of processors, or combinations thereof. In some embodiments, processing subsystem 710 may include one or more special purpose co-processors such as graphics processors, digital signal processors (DSPs), or the like. In some embodiments, some or all of the processing units of processing subsystem 710 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 722, 724. Any type of processors in any combination may be included in processing unit(s) 712, 714.

In some embodiments, processing subsystem 710 may be implemented in a modular design that incorporates any number of modules (e.g., blades in a blade server implementation). Each module may include processing unit(s) and local storage. For example, processing subsystem 710 may include processing unit 712 and corresponding local storage 722, and processing unit 714 and corresponding local storage 724.

Local storage 722, 724 may include volatile storage media (e.g., conventional DRAM, SRAM, SDRAM, or the like) and/or non-volatile storage media (e.g., magnetic or optical disk, flash memory, or the like). Storage media incorporated in local storage 722, 724 may be fixed, removable or upgradeable as desired. Local storage 722, 724 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 712, 714 need at runtime. The ROM may store static data and instructions that are needed by processing unit(s) 712, 714. The permanent storage device may be a non-volatile read-and-write memory device that may store instructions and data even when a module including one or more processing units 712, 714 and local storage 722, 724 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 722, 724 may store one or more software programs to be executed by processing unit(s) 712, 714, such as an operating system and/or programs implementing various server functions such as functions of network analytic system 120, or any other server(s) associated with network analytic system 120. "Software" refers generally to sequences of instructions that, when executed by processing unit(s) 712, 714 cause computing system 702 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 712, 714. In some embodiments the instructions may be stored by storage subsystem 768 (e.g., computer readable storage media). In various embodiments, the processing units may execute a variety of programs or code instructions and may maintain multiple concurrently executing programs or processes. At any given time, some or all of the program code to be executed may be resident in local storage 722, 724 and/or in storage subsystem including potentially on one or more storage devices. Software may be implemented as a single program or a collection of separate programs or program modules that interact as desired. From local storage 722, 724 (or non-local storage described below), processing unit(s) 712, 714 may retrieve program instructions to execute and data to process in order to execute various operations described above.

Storage subsystem 768 provides a repository or data store for storing information that is used by computing system 702. Storage subsystem 768 provides a tangible non-transitory computer-readable storage medium for storing the basic programming and data constructs that provide the functionality of some embodiments. Software (programs, code modules, instructions) that when executed by processing subsystem 710 provide the functionality described above may be stored in storage subsystem 768. The software may be executed by one or more processing units of processing subsystem 710. Storage subsystem 768 may also provide a repository for storing data used in accordance with the present disclosure.

Storage subsystem 768 may include one or more non-transitory memory devices, including volatile and non-volatile memory devices. As shown in FIG. 7, storage subsystem 768 includes a system memory 760 and a computer-readable storage media 752. System memory 760 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 702, such as during start-up, may typically be stored in the ROM. The RAM typically contains data and/or program modules that are presently being operated and executed by processing subsystem 710. In some implementations, system memory 760 may include multiple different types of memory, such as static random access memory (SRAM) or dynamic random access memory (DRAM). Storage subsystem 768 may be based on magnetic, optical, semiconductor, or other data storage media. Direct attached storage, storage area networks, network-attached storage, and the like may be used. Any data stores or other collections of data disclosed herein as being produced, consumed, or maintained by a service or server may be stored in storage subsystem 768.

By way of example, and not limitation, as depicted in FIG. 7, system memory 760 may store application programs 762, which may include client applications, Web browsers, mid-tier applications, relational database management systems (RDBMS), etc., program data 764, and one or more operating systems 766. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 752 may store programming and data constructs that provide the functionality of some embodiments. Software (programs, code modules, instructions) that when executed by processing subsystem 710 a processor provide the functionality described above may be stored in storage subsystem 768. By way of example, computer-readable storage media 752 may include non-volatile memory such as a hard disk drive, a magnetic disk drive, an optical disk drive such as a CD ROM, DVD, a Blu-Ray® disk, or other optical media. Computer-readable storage media 752 may include, but is not limited to, Zip® drives, flash memory cards, universal serial bus (USB) flash drives, secure digital (SD) cards, DVD disks, digital video tape, and the like. Computer-readable storage media 752 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 752 may provide storage of computer-readable instructions, data structures, program modules, and other data for computing system 702.

In certain embodiments, storage subsystem 768 may also include a computer-readable storage media reader 750 that may further be connected to computer-readable storage media 752. Together and, optionally, in combination with system memory 760, computer-readable storage media 752 may comprehensively represent remote, local, fixed, and/or removable storage devices plus storage media for storing computer-readable information.

In certain embodiments, computing system 702 may provide support for executing one or more virtual machines. Computing system 702 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 702. Accordingly, multiple operating systems may potentially be run concurrently by computing system 702. Each virtual machine generally runs independently of the other virtual machines.

Communication subsystem 740 provides an interface to other computer systems and networks. Communication subsystem 740 serves as an interface for receiving data from and transmitting data to other systems from computing system 702. For example, communication subsystem 740 may enable computing system 702 to establish a communication channel to one or more client computing devices via the Internet for receiving and sending information from and to the client computing devices.

Communication subsystem 740 may support both wired and/or wireless communication protocols. For example, in certain embodiments, communication subsystem 740 may include radio frequency (RF) transceiver components for accessing wireless voice and/or data networks (e.g., using cellular telephone technology, advanced data network technology, such as 3G, 2G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 740 may provide wired network connectivity (e.g., Ethernet) in addition to or instead of a wireless interface.

Communication subsystem 740 may receive and transmit data in various forms. For example, in some embodiments, communication subsystem 740 may receive input communication in the form of structured and/or unstructured data feeds, event streams, event updates, and the like. For example, communication subsystem 740 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 740 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 740 may also be configured to output the structured and/or unstructured data feeds, event streams, event updates, and the like to one or more databases that may be in communication with one or more streaming data source computers coupled to computing system 702.

Communication subsystem 740 may provide a communication interface 742, e.g., a WAN interface, which may provide data communication capability between the local area network (bus subsystem 770) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 702 may operate in response to requests received via communication interface 742. Further, in some embodiments, communication interface 742 may connect computing systems 702 to each other, providing scalable systems capable of managing high volumes of activity. Conventional or other techniques for managing server systems and server farms (collections of server systems that cooperate) may be used, including dynamic resource allocation and reallocation.

Computing system 702 may interact with various user-owned or user-operated devices via a wide-area network such as the Internet. An example of a user-operated device is shown in FIG. 7 as client computing system 702. Client computing system 704 may be implemented, for example, as a consumer device such as a smart phone, other mobile phone, tablet computer, wearable computing device (e.g., smart watch, eyeglasses), desktop computer, laptop computer, and so on.

For example, client computing system 704 may communicate with computing system 702 via communication interface 742. Client computing system 704 may include conventional computer components such as processing unit(s) 782, storage device 784, network interface 780, user input device 786, and user output device 788. Client computing system 704 may be a computing device implemented in a variety of form factors, such as a desktop computer, laptop computer, tablet computer, smart phone, other mobile computing device, wearable computing device, or the like.

Processing unit(s) 782 and storage device 784 may be similar to processing unit(s) 712, 714 and local storage 722, 724 described above. Suitable devices may be selected based on the demands to be placed on client computing system 704; for example, client computing system 704 may be implemented as a "thin" client with limited processing capability or as a high-powered computing device. Client computing system 704 may be provisioned with program code executable by processing unit(s) 782 to enable various interactions with computing system 702 of a message management service such as accessing messages, performing actions on messages, and other interactions described above. Some client computing systems 704 may also interact with a messaging service independently of the message management service.

Network interface 780 may provide a connection to a wide area network (e.g., the Internet) to which communication interface 740 of computing system 702 is also connected. In various embodiments, network interface 780 may include a wired interface (e.g., Ethernet) and/or a wireless interface implementing various RF data communication standards such as Wi-Fi, Bluetooth, or cellular data network standards (e.g., 3G, 2G, LTE, etc.).

User input device 786 may include any device (or devices) via which a user may provide signals to client computing system 704; client computing system 704 may interpret the signals as indicative of particular user requests or information. In various embodiments, user input device 786 may include any or all of a keyboard, touch pad, touch screen, mouse or other pointing device, scroll wheel, click wheel, dial, button, switch, keypad, microphone, and so on.

User output device 788 may include any device via which client computing system 704 may provide information to a user. For example, user output device 788 may include a display to display images generated by or delivered to client computing system 704. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 788 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 712, 714 and 782 may provide various functionality for computing system 702 and client computing system 704, including any of the functionality disclosed herein as being performed by a server or client, or other functionality associated with message management services.

It will be appreciated that computing system 702 and client computing system 704 are illustrative and that variations and modifications are possible. Computer systems used in connection with embodiments of the present disclosure may have other capabilities not specifically described here. Further, while computing system 702 and client computing system 704 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

In the preceding description, for the purposes of explanation, specific details are set forth in order to provide a thorough understanding of examples of the disclosure. However, it should be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may have been shown without necessary detail in order to avoid obscuring the examples. The figures and description are not intended to be restrictive.

The description provides examples only, and is not intended to limit the scope, applicability, or configuration of the disclosure. Rather, the description of the examples provides those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some embodiments, the systems may be configured as a distributed system where one or more components of the system are distributed across one or more networks such as in a cloud computing system.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented as a computer program product containing computer program code or instructions executable by one or more processors for performing any or all of the steps, operations, or processes described in this disclosure, where the computer program may be stored on a non-transitory computer readable medium. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method performed by a computing system, the method comprising: receiving a first request to identify one or more host pairs for a first host, the first request including a first Uniform Resource Identifier (URI) associated with the first host;
sending, using the first URI, a second request for a web page, the second request sent to the first host;
receiving, from the first host, a response to the second request;
parsing the response to build the web page, wherein parsing the response causes one or more additional URIs to be called, wherein the one or more additional URIs include a URI associated with a second host;
in response to the additional URI being called, storing, in a database, a pairing of the first host with the second host;
receiving a third request from a user for one or more pairings associated with the first host;
obtaining the pairing from the database;
causing display of the pairing to indicate that the second host was called when building a web page associated with the first host concurrent with a display of a malicious classification of the first host; and
in response to user input selecting the pairing, causing display of a particular segment of code that caused the pairing to be identified.

2. The method of claim 1, wherein the response includes at least one or more of the following:
a header, wherein parsing the response includes parsing the header;
a body, wherein parsing the response includes parsing the body; or
a script, wherein the script causes the additional URI to be called.

3. The method of claim 1, wherein the first request is sent to the computer system in response to selection of a user-selectable option provided in a user interface.

4. The method of claim 1, wherein the web page is not displayed by the computer system.

5. The method of claim 1 further comprising:
identifying, for a first time, one or more first pairings associated with the first host;
identifying, for a second time, one or more second pairings associated with the first host, wherein the one or more first pairings include the pairing;
comparing the one or more first pairings with the one or more second pairings to determine a change from the first time to the second time; and
outputting the change from the first time to the second time.

6. The method of claim 1 further comprising:
determining that the pairing was not identified for the first host at a previous time; and
outputting an indication that the pairing was not identified for the first host at the previous time.

7. The method of claim 1, wherein the first request is sent to the computer system based upon a time schedule, and wherein the time schedule causes one or more host pairs to be identified for the first host over time.

8. The method of claim 1, wherein the first request is generated by the computer system in response to receiving the third request.

9. The method of claim 1, further comprising:
generating a pairing between the additional URI and a change in a Document Object Map (DOM) associated with the web page, wherein parsing the response causes the DOM to be constructed.

10. A non-transitory computer-readable storage medium storing a plurality of instructions executable by one or more processors of a computer system, the plurality of instructions when executed by the one or more processors cause the one or more processors to:
receive a first request to identify one or more host pairs for a first host, the first request including a Uniform Resource Identifier (URI) associated with the first host;
send, using the URI, a second request for a web page, the second request sent to the first host;
receive, from the first host, a response to the second request;
parse the response to build the web page, wherein parsing the response causes one or more additional URIs to be called, wherein the one or more additional URIs include a URI associated with a second host;
in response to the additional URI being called, store, in a database, a pairing of the first host with the second host;
receive a third request from a user for one or more pairings associated with the first host;
obtain the pairing from the database;
causing display of the pairing to indicate that the second host was called when building a web page associated with the first host concurrent with a display of a malicious classification of the first host; and
in response to user input selecting the pairing, cause display of a particular segment of code that caused the pairing to be identified.

11. The non-transitory computer-readable storage medium of claim 10, wherein the response includes at least one or more of the following:
a header, wherein parsing the response includes parsing the header;
a body, wherein parsing the response includes parsing the body; or
a script, wherein the script causes the additional URI to be called.

12. The non-transitory computer-readable storage medium of claim 10, wherein the response includes a request for content, and wherein the request for content is associated with the additional URI.

13. The non-transitory computer-readable storage medium of claim 10, wherein the web page is not displayed by the computer system.

14. The non-transitory computer-readable storage medium of claim 10, wherein the plurality of instructions when executed by the one or more processors further cause the one or more processors to:
identify, for a first time, one or more first pairings associated with the first host;
identify, for a second time, one or more second pairings associated with the first host, wherein the one or more first pairings include the pairing;

compare the one or more first pairings with the one or more second pairings to determine a change from the first time to the second time; and output the change from the first time to the second time.

15. The non-transitory computer-readable storage medium of claim 10, wherein the plurality of instructions when executed by the one or more processors further cause the one or more processors to:

determine that the pairing was not identified for the first host at a previous time; and output an indication that the pairing was not identified for the first host at the previous time.

16. The non-transitory computer-readable storage medium of claim 10, wherein the first request is sent to the computer system based upon a time schedule, and wherein the time schedule causes one or more host pairs to be identified for the first host over time.

17. A system comprising: one or more processors; and a non-transitory computer-readable medium including instructions that, when executed by the one or more processors, cause the one or more processors to:

receive a first request to identify one or more host pairs for a first host, the first request including a first Uniform Resource Identifier (URI) associated with the first host;

send, using the first URI, a second request for a web page, the second request sent to the first host;

receive, from the first host, a response to the second request;

parse the response to build the web page, wherein parsing the response causes one or more additional URIs to be called, wherein the one or more additional URIs include a URI associated with a second host;

in response to the additional URI being called, store, in a database, a pairing of the first host with the second host;

receive a third request from a user for one or more pairings associated with the first host;

obtain the pairing from the database;

cause display of the pairing to indicate that the second host was called when building a web page associated with the first host concurrent with a display of a malicious classification of the first host; and in response to user input selecting the pairing, causing display of a particular segment of code that caused the pairing to be identified.

18. The system of claim 17, wherein the response includes a header, wherein parsing the response includes parsing the header;

a body, wherein parsing the response includes parsing the body; or a script, wherein the script causes the additional URI to be called.

19. The system of claim 17, wherein the instructions, when executed by the one or more processors, further cause the one or more processors to:

identify, for a first time, one or more first pairings associated with the first host;

identify, for a second time, one or more second pairings associated with the first host, wherein the one or more first pairings include the pairing;

compare the one or more first pairings with the one or more second pairings to determine a change from the first time to the second time;

output the change from the first time to the second time;

determine that the pairing was not identified for the first host at a previous time; and output an indication that the pairing was not identified for the first host at the previous time.

20. The system of claim 17, wherein the first request is sent to the system based upon a time schedule, and wherein the time schedule causes one or more host pairs to be identified for the first host over time.

* * * * *